(12) United States Patent
Pintiysky et al.

(10) Patent No.: US 10,642,973 B2
(45) Date of Patent: *May 5, 2020

(54) SYSTEM AND METHOD OF ANALYSIS OF FILES FOR MALICIOUSNESS AND DETERMINING AN ACTION

(71) Applicant: AO Kaspersky Lab, Moscow (RU)

(72) Inventors: Vladislav V. Pintiysky, Moscow (RU); Denis V. Anikin, Moscow (RU); Denis Y. Kobychev, Moscow (RU); Maxim Y. Golovkin, Moscow (RU); Vitaly V. Butuzov, Moscow (RU); Dmitry V. Karasovsky, Moscow (RU); Dmitry A. Kirsanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,328

(22) Filed: May 17, 2019

(65) Prior Publication Data

US 2019/0272371 A1 Sep. 5, 2019

Related U.S. Application Data

(63) Continuation of application No. 15/451,850, filed on Mar. 7, 2017, now Pat. No. 10,339,301.

(30) Foreign Application Priority Data

Feb. 8, 2017 (RU) .................................. 2017104135

(51) Int. Cl.
*G06F 21/53* (2013.01)
*G06F 21/56* (2013.01)
*G06F 9/455* (2018.01)

(52) U.S. Cl.
CPC ............ *G06F 21/53* (2013.01); *G06F 21/566* (2013.01); *G06F 2009/45587* (2013.01); *G06F 2221/034* (2013.01)

(58) Field of Classification Search
CPC ................... G06F 21/53; G06F 21/566; G06F 2009/45587; G06F 2221/034
See application file for complete search history.

(56) References Cited

U.S. PATENT DOCUMENTS 5,818,229 A * 10/1998 Kanazawa ....... G01R 33/56554
                                                                324/309
5,828,821 A * 10/1998 Hoshina .............. G06F 11/1458
                                                                714/15

(Continued)

FOREIGN PATENT DOCUMENTS

JP        2015-166952 A    9/2014
WO       2016209449 A1    12/2016

*Primary Examiner* — Ayoub Alata
(74) *Attorney, Agent, or Firm* — Arent Fox LLP; Michael Fainberg (57) ABSTRACT

Disclosed are systems and methods for analysis of files for maliciousness and determining an action. An exemplary method comprises: opening a file, by a processor, in a virtual machine, intercepting an event arising in an execution of a thread of a process created upon opening of the file, determining, a context of the processor on which the thread is being executed, the determination including reading register values of the processor and a stack, comparing the context with rules that check: a behavior of the thread of the process, a changing, by the thread, of attributes of the file, and an access of the thread to the Internet, and based on a result of the comparison, performing at least one of: recognizing the file as being malicious, halting the execution of the thread, changing the context of the processor, and waiting for a next intercepted event.

21 Claims, 4 Drawing Sheets

(56) References Cited

U.S. PATENT DOCUMENTS

| | | |
|---|---|---|
| 7,779,472 B1 | 8/2010 | Lou |
| 8,479,286 B2 | 7/2013 | Dalcher et al. |
| 8,555,385 B1 | 10/2013 | Bhatkar et al. |
| 8,990,946 B1* | 3/2015 | Yarykin .............. H04L 63/0272 |
| | | 726/24 |
| 9,177,146 B1* | 11/2015 | Lee ....................... G06F 21/566 |
| 2011/0099554 A1 | 4/2011 | Shafi |
| 2011/0225655 A1 | 9/2011 | Niemela et al. |
| 2012/0144489 A1* | 6/2012 | Jarrett ................... G06F 21/566 |
| | | 726/24 |
| 2012/0317570 A1* | 12/2012 | Dalcher ................. G06F 21/53 |
| | | 718/1 |
| 2015/0121135 A1* | 4/2015 | Pape ................... G06F 11/3466 |
| | | 714/15 |
| 2015/0220735 A1 | 6/2015 | Paithane et al. |
| 2015/0379268 A1 | 12/2015 | Singh et al. |

\* cited by examiner

SYSTEM AND METHOD OF ANALYSIS OF FILES FOR MALICIOUSNESS AND DETERMINING AN ACTION

CROSS-REFERENCE TO RELATED APPLICATIONS

This application is a continuation of application Ser. No. 15/451,850 filed on Mar. 7, 2017, which further claims benefit of priority under 35 U.S.C. 119(a)-(d) to a Russian Patent Application No. 2017104135 filed Feb. 8, 2017, which is incorporated by reference herein.

FIELD OF TECHNOLOGY

The disclosure relates generally to the field of cybersecurity and, more specifically, to systems and methods of analysis of files for maliciousness in a virtual machine.

BACKGROUND

At present, there is a growing volume of malicious programs (such as computer viruses, Trojan horses, network worms) designed to inflict harm both to the data of a user and to the actual user of the electronic device infected by the malicious program. The harm may be caused by damaging or deleting user files, using the resources of the user's computing device for "mining" of cryptocurrencies, theft of electronic and confidential user data (correspondence, images, logins, passwords, bank card information) and other actions. Moreover, malicious software is constantly changing, since its creators are employing ever new mechanisms of attack and defense against security applications. Various mechanisms are used, such as obfuscation (in other words, converting the source text or executable code of a program to a form preserving its functionality, but resisting analysis, an understanding of the working algorithms, and modification upon decompilation, for example) of the malicious code or the use of emulation resistant mechanisms (for example, the malicious program is given the ability to recognize when it is being executed in an emulator, and it does not reveal its harmful activity).

Furthermore, a malicious program often does not reveal its malicious activity at once, but instead it performs a number (in the order of millions) of API function calls, enormous cycles (in the order of billions of iterations), and halts its working for a certain time immediately after being launched (e.g., 1 hour of using the "Sleep( )" function). The modern computing devices of users have high performance, multi-core processors (and also multiprocessor systems), and therefore the user might not notice or pay attention to the workload of one of the cores. Moreover, a user normally uses the device after it has been turned on for longer than one hour. Therefore, if it has been started up, there is no need for a malicious program to manifest its activity at once.

In order to deal with the mentioned techniques, the makers of security applications (such antivirus applications) employ detection methods that use virtual machines in the form of an isolated environment for safe execution of files. Often, such virtual machines are known as sandboxes. The hypervisors under whose control such virtual machines run contain mechanisms for intercepting the functions being carried out by applications which are being executed therein.

It should be noted that security applications employ various methods for determining a malicious program, such as signature and/or heuristic analysis technologies. If in the course of the analysis a file was not determined to be malicious, it may be handed over by the security application for analysis of its behavior to the aforementioned virtual machine (e.g., if it does not have a digital signature of a trusted software maker). The file handed over is then executed in the virtual machine, and in the course of its execution its actions and events being carried out by the different function calls are intercepted, the intercepted events and actions are saved in a log, and afterwards analyzed by the security application or an expert in information security.

Thus, the known systems for interception and aggregation of events and actions work in two steps. In the first step, information is gathered; in the second step, it is analyzed.

The drawback of the known systems and methods is that they do not affect the execution process in the course of execution of the file. For example, if a process launched from a file being analyzed (or from an application which opened the file being analyzed) has halted its execution for an hour or is attacking a certain email client or messenger (a program for exchange of messages) by accessing a file with saved passwords, the program being attacked will be absent from the virtual machine, and the maliciousness of the file behavior will not be discovered (since, not having found the required file with passwords, the malicious file will terminate its execution by itself and will not reveal its malicious activity).

SUMMARY

Disclosed are systems and methods for analysis of files for maliciousness and determining an action in a virtual machine. One technical effect and improvement of the disclosed systems and methods is that they influence the process of file execution in a virtual machine when analyzing a file for maliciousness thereby enabling different actions to be performed.

In one exemplary aspect, a method for analysis of files for maliciousness and determining an action comprises: opening a file, by a processor, in a virtual machine, intercepting, by the processor, an event arising in an execution of a thread of a process created upon opening of the file, determining, a context of the processor on which the thread of the process created upon opening of the file is being executed, the determination including reading register values of the processor and a stack, wherein the reading of the stack is performed by using previously read data contained in registers corresponding to the stack, comparing, by the processor, the context of the processor with a plurality of rules that check: a behavior of the thread of the process created upon opening of the file, a changing, by the thread of the process, of attributes of the file, and an access of the thread of the process to the Internet, and based on a result of the comparison, performing at least one of: recognizing the file as being malicious, halting the execution of the thread of the process created upon opening of the file, changing the context of the processor, and waiting for a next intercepted event.

In one aspect, the interception of the event is based on a user level privilege indicating that the user has a privilege to interact with a computing device in one of: a kernel mode or a user mode.

In one aspect, the opened file includes at least one of: an executable file, a dynamic library, a script executed by a given interpreter, a file containing scripts for execution, a web page, an image, and a universal resource link.

In one aspect, the virtual machine is created by a security application of a computing device for which the analysis of files is being performed.

In one aspect, the virtual machine is created on a host operating system that has no link to an operating system of the computing device for which the analysis of files is being performed.

In one aspect, the opening of the file further includes creating at least one thread of execution when the opened file is an executable file.

In one aspect, when the analysis results with waiting for a next intercepted event, the method further comprising: resuming a previously halted execution of the thread, and repeating the analysis upon reception of the next intercepted event.

In another exemplary aspect, a system for analysis of files for maliciousness and determining an action comprises: a hardware processor configured to: open a file in a virtual machine, intercept an event arising in an execution of a thread of a process created upon opening of the file, determine, a context of the processor on which the thread of the process created upon opening of the file is being executed, the determination including reading register values of the processor and a stack, wherein the reading of the stack is performed by using previously read data contained in registers corresponding to the stack, compare the context of the processor with a plurality of rules that check: a behavior of the thread of the process created upon opening of the file, a changing, by the thread of the process, of attributes of the file, and an access of the thread of the process to the Internet, and based on a result of the comparison, performing at least one of: recognizing the file as being malicious, halting the execution of the thread of the process created upon opening of the file, changing the context of the processor, and waiting for a next intercepted event.

Yet in another exemplary aspect, a non-transitory computer readable medium storing thereon computer executable instructions for analysis of files for maliciousness and determining an action in a virtual machine includes instructions for: opening a file, by a processor, in a virtual machine, intercepting, by the processor, an event arising in an execution of a thread of a process created upon opening of the file, determining, a context of the processor on which the thread of the process created upon opening of the file is being executed, the determination including reading register values of the processor and a stack, wherein the reading of the stack is performed by using previously read data contained in registers corresponding to the stack, comparing, by the processor, the context of the processor with a plurality of rules that check: a behavior of the thread of the process created upon opening of the file, a changing, by the thread of the process, of attributes of the file, and an access of the thread of the process to the Internet, and based on a result of the comparison, performing at least one of: recognizing the file as being malicious, halting the execution of the thread of the process created upon opening of the file, changing the context of the processor, and waiting for a next intercepted event.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects on the invention are described herein in the context of a system, method and computer program product for analysis of files for maliciousness in a virtual machine. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
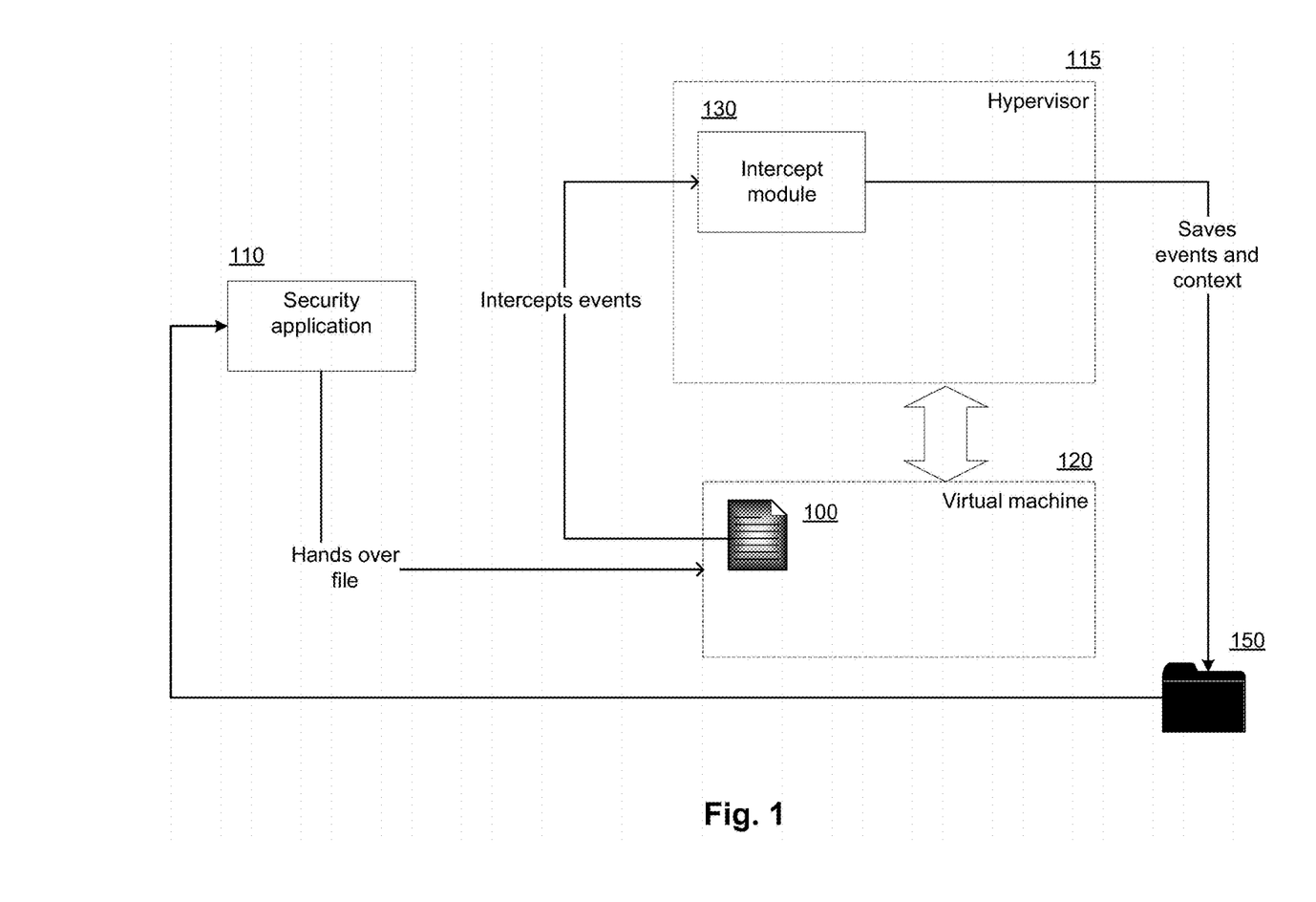
FIG. 1 shows an example of the analysis of files for maliciousness in a virtual machine.

FIG. 1 shows an example of the analysis of a file for maliciousness in a virtual machine. In the general case, for the analysis of maliciousness the file 100 is opened in the virtual machine 120 in the form of an isolated environment for the execution of files. A security module 110 hands over the file 100 to the virtual machine 120. In one exemplary aspect, the virtual machine 120 is created by the security module 110. In another exemplary aspect, the virtual machine 120 is selected by the security module 110 from previously created virtual machines. A virtual machine may include software and hardware providing the resources of a host operating system to a guest operating system, wherein the guest operating system has no link to the host operating system.

It should be noted that the file 100 may include, but not limited to is: an executable file; a dynamic library; a script executed by a given interpreter (such as Microsoft Power-Shell files); files containing scripts for execution (such as files of Microsoft Office or Adobe Acrobat formats); a web page; an image; a link (such as a URL), or other types of files, which can cause harm to the data of a user of a computing device when executed or opened by other applications.

In the general case, the analysis of the file 100 is done after its opening in the operating system of the virtual machine 120. The opening of the file 100 includes, but not limited to: execution of the executable file 100 or opening of the non-executable file 100 by an application.

The result of the opening of the file 100 is the creation of a process and the launching of its execution in the virtual machine 120, and creation of at least one thread of execution.

In one exemplary aspect, the security module 110 and the monitor of virtual machines 115 (hereinafter in the text, a hypervisor), under whose control the virtual machine 120 is working, is executed on the computing device of the user. In the given case, the security module 110 is a security application (such as an antivirus application). In another case, the security module 110 and the hypervisor 115 are executed on a remote server (or on different servers), or as a cloud service. The security module 110 in this case obtains the file 100 from third party sources (for example, from security module 110 running on the computing devices of a user), and hands it over to the virtual machine 120, where the opening of the file 100 occurs.

In the general case, the hypervisor 115 contains an intercept module 130 (the intercept module 130 is a module, a component, or a functional part of the hypervisor 115). The intercept module 130 intercepts the API function calls by the threads of the process created upon opening the file 100 in the virtual machine 120, and reads the context of the processor on which the thread making the API function call is being executed. It should be noted that the context of a processor contains at least the register values of the processor. In one exemplary aspect, the intercept module 130 likewise reads the stack by using previously read data contained in the processor registers corresponding to the stack (for example, the memory at the address from the ESP and EBP registers). Furthermore, the intercept module 130 aggregates the mentioned data, saves it (for example, in a database or in a log 150) and hands it over to the security module 110 after execution of the process created upon opening the file 100. The security module 110 in turn pronounces a verdict as to the maliciousness of the file 100 based on the data from the intercept module 130. In the general case, the verdict is pronounced after analysis of the data saved, for example, depending on the sequence and the parameters in the call for API functions by the threads of the process created upon opening the file 100. In one exemplary aspect, if no verdict is pronounced, the data saved by the intercept module 130 is handed over by the security module 110 to an expert in information security (not shown in FIG. 1) for analysis.

Figure 2:
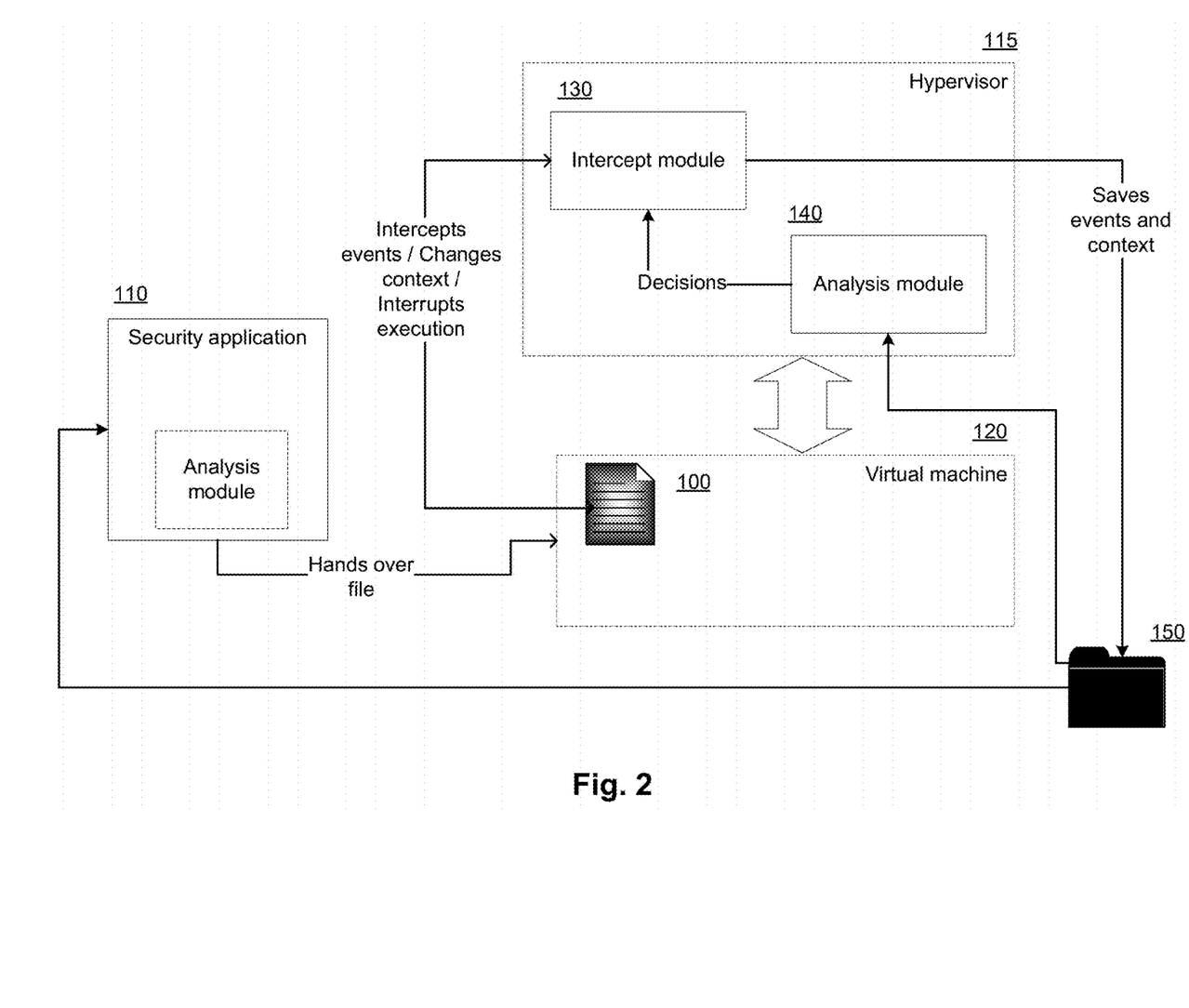
FIG. 2 shows an exemplary system for analyzing files for maliciousness in a virtual machine.

FIG. 2 shows an exemplary system for analyzing files for maliciousness in a virtual machine. In contrast to the system of FIG. 1, in the system of FIG. 2, the intercept module 130 also contains an analysis module 140. In one exemplary aspect, the hypervisor 115 contains the analysis module 140. In another exemplary aspect, the analysis module 140 is a component (module, functional part) of the security module 110. In the general case, the intercept module 130 intercepts events in the threads of the process created upon opening the file 100.

The intercepted events may include, but not limited to: calls of an API function by the thread; the return from an API function; a system call or, in other words, accessing of the kernel of the operating system by the thread to execute a particular operation (system call); the return from a system call; and a message (notification) from the operating system (for example, the creation of a thread, the creation of a process, the loading of a module).

When an event is intercept, the execution of the thread is halted by the intercept module 130. It should be noted that an intercepting is possible on different rings of protection of the operating system of the virtual machine 120, realizing a hardware partitioning of the system and user levels of privileges, enabling the intercepting of events at: the kernel level (kernel mode) and/or the applications level (user mode). In one exemplary aspect, the execution of the thread may be halted by stopping the execution of the instructions of the thread.

It should be noted that, during the execution of the threads of the process created upon opening the file 100, the intercept module 130 determines the coding convention of the API functions being called by the threads. This allows a distinct determination of the use of the registers of the processor for the transmittal of parameters to the API functions being called. Thus, for example, the parameters of the calls will be found in the registers ECX (first parameter), EDX (second parameter), and the rest of the parameters will be in the stack (ESP register). Furthermore, the coding convention enables a distinct determination of the values being returned. For example, if an API function returns the value "0", this is done in the register EAX.

The intercepted event and the context of the processor are saved by the intercept module in the log 150. After being saved, the log 150 is handed over by the intercept module 130 to the analysis module 140. The analysis module 140 uses a set of templates. In one exemplary aspect, the templates are stored in a data structure (such as a tree). The templates can be added to the data structure by the analysis module 140 during the booting of the virtual machine 120. In another exemplary aspect, the templates are chosen by the analysis module 140 from a database.

In the general case, a template contains one or more rules. In one aspect, each rule is assigned a priority. In another aspect, rules are added to the template in no particular order.

A rule is a logical condition based on the use of logic operands (such as "if" or "logical or"). Moreover, the rules may be related to each other. In one exemplary aspect, the rule utilizes the saved context of the processor. In another exemplary aspect, the rule contains the logic of change of the context of the processor and the data for changing the context of the processor. In yet another exemplary aspect, the rule contains the logic by which the analysis module 140 recognizes the opened file 100 as being malicious.

Examples of the above-mentioned rules are:

Rule 1: "if" FileOpen("$SytemDrive:\<random name>") is called, "then" continue the execution.

Rule 2: "if" Rule 1 and FileWrite("$SytemDrive:\<random name>", text line), "then" continue the execution.

In the above-described example, the thread of the process created upon opening the file 100 is requesting a random (required) file in the root of the system disk. The mere event of creation (or reading) of the required file is not malicious, but it is often the start of a malicious functionality. Therefore, the analysis module 140 on the basis of the rules makes a decision to continue the execution of the mentioned thread. Later on, the requested file is written into. Depending on the type of requested file and the information written into it, the requested file may have a malicious functionality.

A more detailed example of the working of the system and the rules is provided next:

Rule 10: "if" file 100 is not signed, continue the execution.

Rule 11: "if" rule 10, "and" file 100 has called FileOpen ("$SytemDrive:\<random name>"), "then" change the value returned to "Success" "and" continue execution.

Rule 12: "if" rule 11, "and" file 100 has called FileWrite ("$SytemDrive:\<random name>", memory clipboard used by the process created upon opening file 100), "then" recognize file 100 as malicious "and" end the execution.

It should be noted that in the presented example of the rules "file 100" is used for a clearer and more comprehensible presentation of the rules. In the general case, the rule uses the threads of the process created upon opening the file 100.

In the above-described example, the file 100 is not signed, that is, the supplier (creator) of the file 100 is unknown. Later on, the thread of the process created upon opening the file 100 also accesses a random file in the root of the system disk in the process of its execution. However, the operating system usually prohibits the creation of a file in the root of the system disk (malicious files can try other paths until the file is created). Therefore, the analysis module 140 on the basis of the rules makes a decision to change the result being returned to "success", with the help of the intercept module 130 the result is replaced, and then the execution of the thread of the process created upon opening of the file 100 is continued. Then, the file created is written into. If a memory clipboard has been written into the file created, the file may be malicious (have a malicious functionality). It makes sense to cease the analysis of the file 100, and then perform an analysis of the created file, and from the results of the analysis of the created file to pronounce a verdict as to the maliciousness of the file 100.

It should be noted that only examples of rules are described above. In the general case, the rules can be more voluminous, for example, they may track the creation of a file along different paths, track the extension of a file being created, analyze the type of file created, allow the creation of the file and track the further behavior of the threads of the process created upon opening of the file 100 (for example, will there be an attempt to add the created file to the startup list of the operating system in some known manner?), track the changing by the threads of the attributes of either the file 100 or other files, and track the access of the threads to the Internet.

In one exemplary aspect, the analysis module 140 also works with expert data (of the examination) which is stored in a separate database. This data may also be used in the rules of the templates. An example of such a rule may be:

Rule 21: "if" the file 100 accesses a web resource, "and" the web resource has been assigned a malicious category, "then" recognize the file 100 as being malicious.

It should be noted that in the above-described example the category of the web resource being accessed by the thread of the process created upon opening of the file 100 in the virtual machine has previously been determined (assigned) by know method and is saved in a separate database.

In one exemplary aspect, the rule may contain a condition for the depth of the analysis or the depth of aggregation of the events. For example:

Rule 31: "if" the file 100 is executing a cycle, "and" the context of the events of the API function call does not change, "then" do not intercept the event of the return from the API functions.

This example of a rule makes it possible to speed up the execution of the file 100 by decreasing the number of interceptions of events and reading of context. If the thread of the process created upon opening the file 100 has called for a cycle lasting in the order of one billion iterations, consisting of the calls "CreateWindow( )" and "CloseWindow( )", it does not make sense to intercept and save the context of each event. The intercept module 130 as described above is triggered at least four billion times (in the cycle, two API functions are called, the event is a call and a return from an API function), and will read the context of the processor just as many times.

In one exemplary aspect, the rule may contains a condition for increasing a variable of the cycle. For example:

Rule 41: "if" the file 100 is executing a cycle, "and" the context of the events of the API function call does not change, "then" increase the value of the cycle variable by 5 times after every 10 iterations.

The above-described example can be used to speed up the execution of the cycles by the thread of the process created upon the opening in the virtual machine 120 of the file 100. The analysis module determines that the thread being executed cyclically calls up certain events. Nothing occurs during this process, which is one of the known scripts for anti-emulation. In order for the thread of the process created upon opening of the file 100 to display its functionality most fully, it is necessary to complete the cycle as soon as possible and continue the execution. Because of the above-described rule, the cycle will be completed several times faster.

Thus, the analysis module 140 after obtaining the log 150 from the intercept module 130 analyzes the events occurring, that is, the events (current and previous) saved in the log 150, and the data of the occurring events (for example, the context of the processor corresponding to a particular event). The analysis consists in comparing the events which have occurred with a template. The event is compared consecutively with each rule saved in the template (depending on the order of the rules in the template or their priority). On the basis of the comparison, the analysis module 140 makes at least one of the decisions: decision to recognize the file 100 as being malicious; decision to halt the execution of the process created upon opening of the file 100; decision to change the context of the processor; and decision to wait for the next event.

It should be noted that the analysis module 140 may combine the above-mentioned decisions. For example, if the file 100 was recognized as being malicious, in one exemplary aspect it is possible to halt the execution of the process created upon opening the file 100. In another exemplary aspect, it is possible to continue the execution of the process created upon opening of the file 100, that is, to wait for the next event, for further analysis of the behavior of the threads of the process and creation of the log 150. In one exemplary aspect, the file 100 is recognized as being malicious, but the context of the processor is changed and the next event is waited for. Such a sequence of actions is necessary for a more complete revelation of the functionality of the file 100. For example, the file 100 has been recognized as being malicious after yet another file containing malicious code was created in the analysis process. However, in certain instances (for example a thread attempts to download something from a malicious web resource) it makes sense to continue to intercept events and to fill the log 150 for analysis of the further behavior of the threads of the process created upon opening of the file 100. In yet another exemplary aspect, even if the file 100 was not recognized as being malicious (for example, a window was opened in the process of execution, awaiting data entry from the user), a decision is made to halt the execution of the process created upon opening of the file 100.

The decisions made are handed over by the analysis module 140 to the intercept module 130. The intercept module 130 carries out the actions in accordance with the decisions made. In the event that the analysis module 140 makes a decision to wait for the next event, the execution of the thread which was halted by the intercept module 130 is resumed.

In one exemplary aspect, the analysis module 140 initiates a rebooting of the virtual machine 120. For example, if in the process of analysis of the file 100 a new file was created, the path to which has been added to the startup list of the operating system of the virtual machine 120, the analysis module 140 initiates a rebooting in order to check the functionality of the created file for maliciousness.

In the general case, after finishing the analysis of the file 100 in the virtual machine 120, the intercept module 130 will hand over the log 150 to the security module 110. Analysis of the file 100 may be completed in a normal manner (the threads of the process created upon opening of the file 100 themselves finish the execution) or by decision of the analysis module 140 (the analysis module 140 has pronounced a decision to halt the process created upon opening of the file 100).

Thus, this system is able to reveal the maliciousness of a file 100 on the basis of decisions from the analysis module 140, namely, on the basis of whether a decision was pronounced recognizing the file 100 as being malicious.

Figure 3:
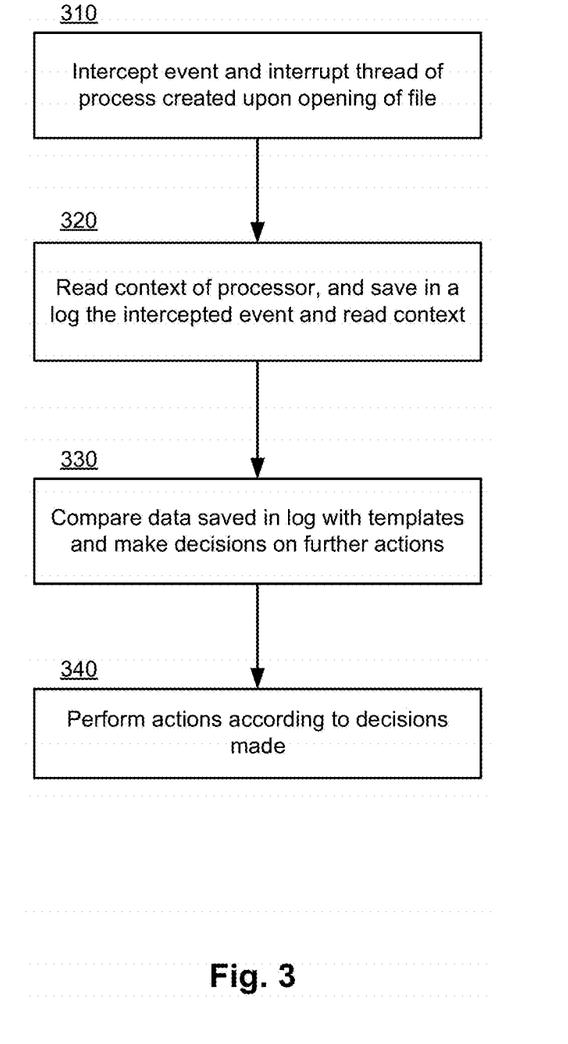
FIG. 3 shows an exemplary method for analyzing files for maliciousness in a virtual machine.

FIG. 3 shows an exemplary method for analyzing files for maliciousness in a virtual machine. In the general case, the security module 110 sends a file 100 to the virtual machine 120 for analysis of its maliciousness. The analysis of the file 100 is done after its opening in the operating system of the virtual machine 120. In the starting step 310, the intercept module 130 is used to intercept an event arising in the process of execution of the thread of the process created upon opening of the file 100. The event is at least one of the following: a calling of an API function by the thread; a return from an API function; a system call; a return from a system call; and a notification from the operating system. Along with the intercepting of the event, the intercept module 130 may also halt the execution of the thread of the process created upon opening of the file 100.

Next, in step 320, the intercept module 130 reads the context of at least one processor on which the thread of the process created upon opening of the file 100 is being executed. The context of the processor in this case contains at least the register values of the processor. The intercepted event and the read context of the processor are saved by the intercept module 130 in a log 150.

Next, in step 330, the analysis module 140 compares the data saved in the log 150 with at least one template, which in turn contains at least one rule. In one exemplary aspect, the rule contains at least one event. In yet another exemplary aspect, the rule contains at least one processor context. As a result of the comparison of the data saved in the log 150 with the rules contained in the template, the analysis module 140 is used to make at least one of the decisions: decision to recognize the file 100 as being malicious; decision to halt the execution of the process created upon opening of the file 100; decision to change the context of the processor; and decision to wait for the next event.

Next, in step 340, the decisions made by the analysis module 140 are provided to the intercept module 130 and the intercept module 130 carries out actions according to the decisions made.

Figure 4:
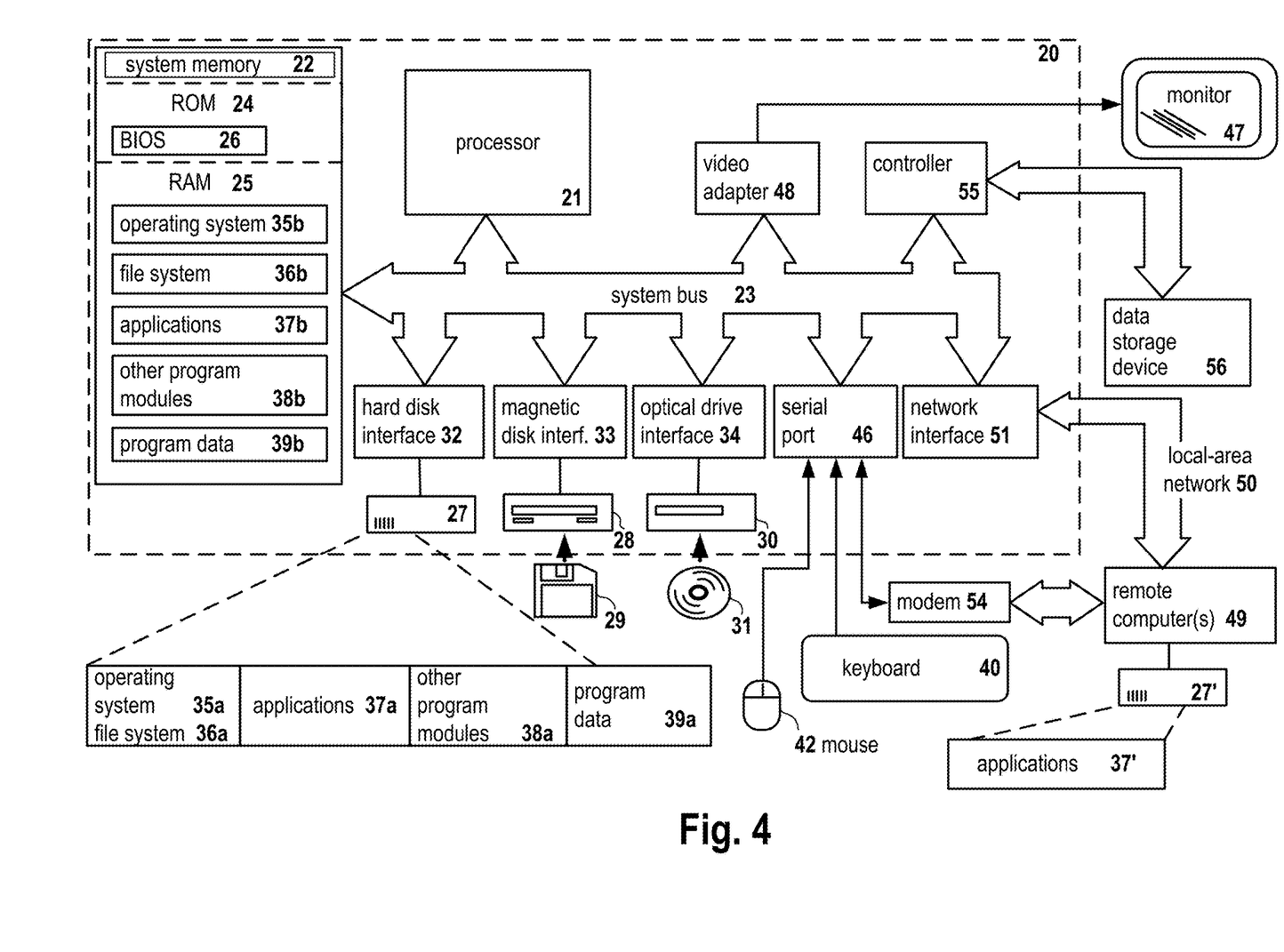
FIG. 4 shows an example of a general-purpose computer system on which the aspects of the systems and methods of analysis of files for maliciousness in a virtual machine can be implemented.

FIG. 4 is a diagram illustrating an example computer system on which aspects of systems and methods for analysis of files for maliciousness in a virtual machine may be implemented in accordance with an exemplary aspect of the invention. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36a, in which the operating system 35a, may be stored, as well as additional program applications 37a, other program modules 38a, and program data 39a stored in the hard disk 27. In one aspect, the RAM 25 may comprise a file system 36b, in which the operating system 35b, may be stored, as well as additional program applications 37b, other program modules 38b and program data 39b. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20, e.g., a hard disk 27' for reading and writing data, program applications 37', and the like. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of software instructions, as well as those based on neuromorphic chips (neurosynaptic chips) to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIGS. 1-4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for analysis of files for maliciousness and determining an action, the method comprising:
   opening a file, by a processor, in a virtual machine;
   intercepting, by the processor, an event arising in an execution of a thread of a process created upon opening of the file;
   determining, a context of the processor on which the thread created upon opening of the file is being executed, the determination including reading register values of the processor and a stack, wherein the reading of the stack is performed by using previously read data contained in registers corresponding to the stack;
   comparing, by the processor, the context of the processor with a plurality of rules that check: a behavior of the thread created upon opening of the file, a changing made, by the thread, to attributes of the file, and an access of the thread to the Internet; and
   based on a result of the comparison, recognizing the file as being malicious, and performing at least one of: halting the execution of the thread created upon opening of the file or changing the context of the processor, and waiting for a next intercepted event.

2. The method of claim 1, wherein the interception of the event is based on a user level privilege indicating that the user has a privilege to interact with a computing device in one of: a kernel mode or a user mode.

3. The method of claim 1, wherein the opened file includes at least one of: an executable file, a dynamic library, a script executed by a given interpreter, a file containing scripts for execution, a web page, an image, and a universal resource link.

4. The method of claim 1, wherein the virtual machine is created by a security application of a computing device for which the analysis of files is being performed.

5. The method of claim 4, wherein the virtual machine is created on a host operating system that has no link to an operating system of the computing device for which the analysis of files is being performed.

6. The method of claim 1, wherein the opening of the file further includes creating at least one thread of execution when the opened file is an executable file.

7. The method of claim 1, further comprising:
   resuming a previously halted execution of the thread, and repeating the analysis upon reception of the next intercepted event.

8. A system for analysis of files for maliciousness and determining an action, the system comprising:
   a hardware processor configured to:
      open a file in a virtual machine;
      intercept an event arising in an execution of a thread of a process created upon opening of the file;
      determine, a context of the processor on which the thread created upon opening of the file is being executed, the determination including reading register values of the processor and a stack, wherein the reading of the stack is performed by using previously read data contained in registers corresponding to the stack;
      compare the context of the processor with a plurality of rules that check: a behavior of the thread created upon opening of the file, a changing made, by the thread, to attributes of the file, and an access of the thread to the Internet; and based on a result of the comparison, recognize the file as being malicious, and perform at least one of: halting the execution of the thread created upon opening of the file or changing the context of the processor, and waiting for a next intercepted event.

9. The system of claim 8, wherein the interception of the event is based on a user level privilege indicating that the user has a privilege to interact with a computing device in one of: a kernel mode or a user mode.

10. The system of claim 8, wherein the opened file includes at least one of: an executable file, a dynamic library, a script executed by a given interpreter, a file containing scripts for execution, a web page, an image, and a universal resource link.

11. The system of claim 8, wherein the virtual machine is created by a security application of a computing device for which the analysis of files is being performed.

12. The system of claim 11, wherein the virtual machine is created on a host operating system that has no link to an operating system of the computing device for which the analysis of files is being performed.

13. The system of claim 8, wherein the configuration for opening of the file further includes a configuration for creating at least one thread of execution when the opened file is an executable file.

14. The system of claim 8, the processor further configured to:

resume a previously halted execution of the thread, and repeat the analysis upon reception of the next intercepted event.

15. A non-transitory computer readable medium storing thereon computer executable instructions for analysis of files for maliciousness and determining an action, including instructions for:

opening a file, by a processor, in a virtual machine;

intercepting, by the processor, an event arising in an execution of a thread of a process created upon opening of the file;

determining, a context of the processor on which the thread created upon opening of the file is being executed, the determination including reading register values of the processor and a stack, wherein the reading of the stack is performed by using previously read data contained in registers corresponding to the stack;

comparing, by the processor, the context of the processor with a plurality of rules that check: a behavior of the thread created upon opening of the file, a changing made, by the thread, to attributes of the file, and an access of the thread to the Internet; and based on a result of the comparison, recognizing the file as being malicious, and performing at least one of: halting the execution of the thread created upon opening of the file or changing the context of the processor, and waiting for a next intercepted event.

16. The non-transitory computer readable medium of claim 15, wherein the interception of the event is based on a user level privilege indicating that the user has a privilege to interact with a computing device in one of: a kernel mode or a user mode.

17. The non-transitory computer readable medium of claim 15, wherein the opened file includes at least one of: an executable file, a dynamic library, a script executed by a given interpreter, a file containing scripts for execution, a web page, an image, and a universal resource link.

18. The non-transitory computer readable medium of claim 15, wherein the virtual machine is created by a security application of a computing device for which the analysis of files is being performed.

19. The non-transitory computer readable medium of claim 18, wherein the virtual machine is created on a host operating system that has no link to an operating system of the computing device for which the analysis of files is being performed.

20. The non-transitory computer readable medium of claim 15, wherein the instructions for opening of the file include instructions for creating at least one thread of execution when the opened file is an executable file.

21. The non-transitory computer readable medium of claim 15, the instructions further comprising instructions for:

resuming a previously halted execution of the thread, and repeating the analysis upon reception of the next intercepted event.

* * * * *